(12) United States Patent
Richardson et al.

(10) Patent No.: US 7,056,063 B2
(45) Date of Patent: Jun. 6, 2006

(54) APPARATUS FOR INDICATION OF AT LEAST ONE SUBSURFACE BARRIER CHARACTERISTIC

(75) Inventors: John G. Richardson, Idaho Falls, ID (US); Reva A. Nickelson, Shelley, ID (US); Paul A. Sloan, Rigby, ID (US); Kevin M. Kostelnik, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 10/850,636

(22) Filed: May 20, 2004

(65) Prior Publication Data

US 2004/0218980 A1   Nov. 4, 2004

Related U.S. Application Data

(60) Continuation-in-part of application No. 10/411,521, filed on Apr. 14, 2003, now Pat. No. 6,802,670, which is a continuation-in-part of application No. 10/411,534, filed on Apr. 4, 2003, now Pat. No. 6,896,446, and a continuation-in-part of application No. 10/412,491, filed on Apr. 3, 2003, now Pat. No. 6,851,890, which is a continuation-in-part of application No. 10/358,633, filed on Feb. 4, 2003, now Pat. No. 6,910,829, and a continuation-in-part of application No. 10/062,817, filed on Feb. 1, 2002, now Pat. No. 6,758,634, which is a division of application No. 09/729,435, filed on Dec. 4, 2000, now Pat. No. 6,575,663.

(60) Provisional application No. 60/267,320, filed on Feb. 6, 2001.

(51) Int. Cl.
*E02D 5/14* (2006.01)

(52) U.S. Cl. .................................................. 405/129.5
(58) Field of Classification Search .............. 405/129.5
See application file for complete search history.

(56) References Cited

U.S. PATENT DOCUMENTS

| 910,421 A | 1/1909 | Schlueter |
|---|---|---|
| 2,101,285 A | 12/1937 | Stevens |
| 3,411,305 A | 11/1968 | Cella |
| 4,557,759 A | 12/1985 | McGrew et al. |

(Continued)

OTHER PUBLICATIONS

Pearlman, Leslie, "Subsurface containment and Monitoring Systems: Barriers and Beyond," National Network of Environmental Management Studies Fellow for U.S. Environmental Protection Agency, Mar. 1999.

*Primary Examiner*—John Kreck
(74) *Attorney, Agent, or Firm*—TraskBritt, P.C.

(57) ABSTRACT

A containment system for use adjacent to a selected region of a subterranean formation and comprising a plurality of laterally interlocked casing strings. At least one electrically conductive element is disposed along at least a portion of a casing string and is used for performing electrical time domain reflectometry. At least one protective element may be positioned between portions of adjacent casing strings of the barrier, and at least one electrically conductive element may be disposed at least partially within the at least one protective element for use in indicating at least one characteristic of at least a portion of the containment system. Electrical time domain reflectometry (TDR) may be used to indicate the at least one characteristic; for instance, TDR may be used to indicate leakage through the barrier or a discontinuity or void in a barrier filler material.

23 Claims, 9 Drawing Sheets

U.S. PATENT DOCUMENTS

| | | |
|---|---|---|
| 4,601,615 A | 7/1986 | Cavalli |
| 4,632,602 A | 12/1986 | Hovnanian |
| 4,634,187 A | 1/1987 | Huff et al. |
| 4,670,305 A | 6/1987 | Morgenthaler et al. |
| 4,676,693 A | 6/1987 | Hiroshima et al. |
| 4,741,644 A | 5/1988 | Cavalli et al. |
| 4,947,470 A | 8/1990 | Darilek |
| 4,949,076 A | 8/1990 | Wann |
| 4,997,313 A | 3/1991 | Gibson et al. |
| 5,009,266 A | 4/1991 | Dieter |
| 5,013,185 A | 5/1991 | Taki |
| 5,018,576 A | 5/1991 | Udell et al. |
| 5,030,034 A | 7/1991 | Bodine |
| 5,037,240 A | 8/1991 | Sherman |
| 5,054,961 A | 10/1991 | Sherman |
| 5,076,727 A | 12/1991 | Johnson et al. |
| 5,106,233 A | 4/1992 | Breaux |
| 5,127,771 A * | 7/1992 | Wind .................... 405/129.45 |
| 5,180,251 A | 1/1993 | Paurat et al. |
| 5,199,816 A | 4/1993 | Paurat et al. |
| 5,240,348 A * | 8/1993 | Breaux .................... 405/129.8 |
| 5,259,705 A | 11/1993 | Breaux et al. |
| 5,280,243 A | 1/1994 | Miller |
| 5,305,798 A | 4/1994 | Driver |
| 5,324,433 A | 6/1994 | Grant et al. |
| 5,340,406 A | 8/1994 | Fearon |
| 5,354,149 A | 10/1994 | Breaux |
| 5,360,293 A * | 11/1994 | Breaux et al. ........... 405/129.8 |
| 5,388,931 A | 2/1995 | Carlson |
| 5,460,032 A | 10/1995 | Hampton et al. |
| 5,476,992 A | 12/1995 | Ho et al. |
| 5,487,622 A | 1/1996 | Cherry et al. |
| 5,531,895 A | 7/1996 | Alford et al. |
| 5,551,807 A | 9/1996 | Breaux |
| 5,570,974 A | 11/1996 | Jax et al. |
| 5,584,610 A | 12/1996 | Simpson et al. |
| 5,605,417 A | 2/1997 | Englert et al. |
| 5,611,642 A | 3/1997 | Wilson |
| 5,676,207 A | 10/1997 | Simon et al. |
| 5,716,164 A | 2/1998 | Biro et al. |
| 5,758,993 A | 6/1998 | Schednecht et al. |
| 5,765,965 A | 6/1998 | Carter, Jr. et al. |
| 5,800,096 A | 9/1998 | Barrow |
| 5,816,344 A | 10/1998 | Turner |
| 5,816,748 A | 10/1998 | Kleiser et al. |
| 5,818,241 A | 10/1998 | Kelly |
| 5,861,090 A | 1/1999 | Clarke et al. |
| 5,879,110 A | 3/1999 | Carter, Jr. |
| 5,905,184 A | 5/1999 | Carter, Jr. |
| 5,961,437 A | 10/1999 | Smith et al. |
| 5,971,440 A | 10/1999 | Boatman |
| 5,975,800 A | 11/1999 | Edwards et al. |
| 6,016,714 A | 1/2000 | Smith et al. |
| 6,099,206 A | 8/2000 | Pennell |
| 6,102,617 A | 8/2000 | Hampton |
| 6,138,752 A | 10/2000 | Bass et al. |
| 6,250,848 B1 | 6/2001 | Moridis et al. |
| 6,258,273 B1 | 7/2001 | Gee |
| 6,280,118 B1 | 8/2001 | Suthersan et al. |
| 6,281,801 B1 | 8/2001 | Cherry et al. |
| 6,312,605 B1 | 11/2001 | Kerfoot |
| 6,427,402 B1 | 8/2002 | White |
| 6,457,905 B1 | 10/2002 | Nickell |
| 6,575,663 B1 | 6/2003 | Kostelnik et al. |
| 6,648,552 B1 * | 11/2003 | Smith et al. ............. 405/129.5 |
| 6,758,633 B1 | 7/2004 | Yen |
| 2002/0107428 A1 | 8/2002 | Nickelson et al. |
| 2003/0152427 A1 | 8/2003 | Nickelson et al. |
| 2003/0175083 A1 | 9/2003 | Kostelnik et al. |
| 2003/0190194 A1 | 10/2003 | Kostelnik et al. |
| 2003/0198517 A1 | 10/2003 | Kostelnik et al. |
| 2005/0063784 A1 | 3/2005 | Nickelson et al. |

\* cited by examiner

APPARATUS FOR INDICATION OF AT LEAST ONE SUBSURFACE BARRIER CHARACTERISTIC

RELATED APPLICATIONS

This application is a continuation-in-part of U.S. application Ser. No. 10/358,633, filed Feb. 4, 2003 entitled IN SITU RETRIEVAL OF CONTAMINANTS OR OTHER SUBSTANCES USING A BARRIER SYSTEM AND LEACHING SOLUTIONS AND COMPONENTS, PROCESSES AND METHODS RELATING THERETO now U.S. Pat. No. 6,910,829, which is a continuation-in-part of U.S. application Ser. No. 10/062,817, filed Feb. 1, 2002 and entitled SUBSURFACE MATERIALS MANAGEMENT AND CONTAINMENT SYSTEM, COMPONENTS THEREOF AND METHODS RELATING THERETO now U.S. Pat. No. 6,758,634, which claims the benefit of U.S. Provisional Application No. 60/267,320, filed Feb. 6, 2001 entitled SUBSURFACE MATERIALS MANAGEMENT AND CONTAINMENT SYSTEM, the disclosure of each of which is incorporated by reference herein in its entirety, respectively. This application is a continuation-in-part of U.S. application Ser. No. 10/411,534 filed Apr. 4, 2003, now U.S. Pat. No. 6,896,446 U.S. application Ser. No. 10/411,521 filed Apr. 14, 2003 now U.S. Pat. No. 6,802,670 and U.S. application Ser. No. 10/412,491 filed Apr. 3, 2003 now U.S. Pat. No. 6,851,890 all entitled ADVANCED CONTAINMENT SYSTEM, each of which is a divisional of U.S. application Ser. No. 09/729,435 now U.S. Pat. No. 6,575,663, filed Dec. 4, 2000, now U.S. Pat. No. 6,575,663, issued Jun. 10, 2003, and entitled ADVANCED CONTAINMENT SYSTEM and the disclosure of each of which is incorporated by reference herein in its entirety, respectively.

GOVERNMENT RIGHTS

The United States Government has rights in the following invention pursuant to Contract No. DE-AC07-99ID13727 between the U.S. Department of Energy and Bechtel BWXT Idaho, LLC.

BACKGROUND OF THE INVENTION

1. Field of the Invention

The present invention relates generally to methods, apparatus and systems for measuring at least one characteristic of a subsurface barrier. Particularly, the methods, apparatus, and systems of the present invention relate to measuring at least one characteristic of an interlocking structure formed between adjacent adjoined casing sections that form, at least partially, a barrier for waste containment.

2. State of the Art

Containment, management, and disposal of various types of waste, such as chemical, nuclear, and other potentially harmful types of waste are recognized, longstanding problems. It is also well recognized that buried waste may often include heavy metals such as mercury or cadmium, carcinogenic materials such as trichloroethylene, radioactive materials, or other hazardous substances. Further, hazardous materials within buried waste may be leached (i.e., carried from within a liquid) therefrom, into surrounding soil and into the groundwater. Because water is used for human consumption and for agriculture, contamination of groundwater by leaching is a major concern.

However, the contamination caused by buried waste may not be limited solely to groundwater. For instance, contaminated groundwater may be carried into other waterways such as streams, rivers, and lakes, thus polluting those waterways and leading to poisoning of plant and animal life. In addition, polluted waterways pose a threat to humans as well, particularly in the case of waterways and bodies of water used for recreational purposes or as sources of drinking or irrigation water.

Also, while many of the problems associated with buried waste concern the effect of leachate on water systems, buried waste may also emit gas phase contaminants that may cause deleterious effects if not contained and managed. For instance, such gas phase contaminants may pollute the soil and the groundwater, and may build up to unsafe pressures which could ultimately result in explosion or pollution of the atmosphere by venting of the gas.

Accordingly, a variety of methods and devices have been devised to attempt to resolve the problems related to buried waste. These remedies may be broadly grouped into the categories of remediation and containment. Generally, remediation focuses on processes designed to change the chemical composition of a contaminated material or contaminant to a more benign chemical composition, while containment remedies seek to isolate contaminants and contaminated material within an area or remove them from an area.

Remediation approaches such as biological treatments, thermal processes, and chemical processes may be problematic for a variety of reasons. In particular, many remediation techniques may be expensive and potentially hazardous. Further, it may be difficult to verify the effectiveness of many remediation treatments. Also, determining the proper or optimum remediation technique for a given contamination scenario may be, in itself, a complex and time-consuming process.

Containment, barrier, or in situ approaches are problematic as well. One known containment approach is simply to dig up and remove the contaminated soil for treatment or disposal. This approach is expensive and time-consuming and often accomplishes little more than moving the problem to another location. Of course, finding an acceptable ultimate disposal location is another significant impediment to movement of a contaminated region. Other containment approaches may involve installing vertical barriers, horizontal barriers, or both types of barriers around the buried waste. In theory, this approach is attractive because it does not require digging up or otherwise disturbing the buried waste.

However, conventional containment or barrier systems suffer from a variety of inadequacies including a lack of durability, corrosion resistance, and structural integrity. These inadequacies are a function of numerous factors associated with the environment in which the containment or barrier systems are located including, but not limited to: exposure to harsh chemicals such as concentrated saline solutions, saturated calcite and gypsum solutions; exposure to extreme thermal gradients; and exposure to stresses induced by shifting in the earth. In addition, conventional barrier systems may suffer from inadequate ability to monitor or verify the integrity thereof as well as inadequate reparability thereof if a failure should occur.

Accordingly, recently, containment systems that are designed to contain, collect, or process effluent which would otherwise escape from a zone containing waste materials, have been developed. One such containment system is disclosed in U.S. Pat. No. 6,575,663 to Kostelnik, et al., assigned to the assignee of the present invention, the disclosure of which is incorporated in its entirety by reference herein. More particularly, U.S. Pat. No. 6,575,663 discloses a barrier comprising a series of adjacent casing strings that are interlocked with one another and may be filled with a barrier filling material to form a substantially continuous wall.

Also, U.S. Pat. No. 5,800,096 to Barrow discloses a subsurface barrier having a number of interconnected columns. In addition, U.S. Pat. No. 5,800,096 to Barrow discloses that the interconnected region between two interconnected columns may be filled with wax, grout, polymer, or other viscous sealer via pipes disposed proximate to the interconnected region and having outlets directed toward the interconnected region.

While the above-mentioned exemplary containment systems may form a relatively stable and corrosion resistant containment system, it may be desirable to monitor the effectiveness or integrity of the containment system after formation or during formation thereof. For instance, it may be desirable to determine the presence of deficiencies in the materials used to form a barrier. Similarly, it may be desirable to detect leaks through the barrier which may carry contaminated materials thereacross.

For instance, U.S. Pat. No. 6,575,663 also discloses a "smart casing" that may include joint integrity sensors comprising acoustic/ultrasonic time domain reflectometry sensors that detect cracks and large voids in structures such as smart casing sections or optical fiber sensors which may indicate strain measurements in smart casing sections and may indicate the presence of voids and cracks therein.

U.S. Pat. Nos. 6,016,714 and 6,648,552 to Smith, each of which are assigned to the assignee of the present invention and each of the disclosures of which is incorporated in its entirety by reference herein, each discloses placement of conductors for detecting any strain, i.e., a change in dimension, which takes place in the material of a barrier. Specifically, strain will generally elongate the conductors where the strain occurs and this will result in a change in the characteristic impedance of the affected conductors. U.S. Pat. Nos. 6,016,714 and 6,648,552 to Smith disclose that such a change in characteristic impedance can be measured with electrical time domain reflectometry; thus, indication of strain and the location of such strain may be identified and data might advantageously be collected via a computer-based data acquisition system.

In view of the conventional apparatus, methods, and systems for monitoring or verifying the integrity of waste containment structures, it may be desirable to provide improved methods, apparatus, and systems for monitoring the integrity of a waste containment structure, particularly a substantially continuous barrier formed of adjacent casing strings.

BRIEF SUMMARY OF THE INVENTION

The present invention relates to a containment system for containing material within a selected region of a subterranean formation. Particularly, the present invention relates to a barrier for waste containment. For instance, a barrier of the present invention may include a plurality of casing strings, wherein each of the plurality of casing strings is adjoined to at least another laterally adjacent casing string of the plurality of casing strings by way of an interlocking structure. Further, the plurality of casing strings may be sized, positioned, and configured to collectively form a continuous barrier about, or at least adjacent, a selected region. In addition, at least one electrically conductive element may be disposed along at least a portion of the length of at least one of the casing strings, the at least one electrically conductive element configured to communicate an electrical signal for performing electrical time domain reflectometry.

Such a configuration may be desirable for determining at least one characteristic of the barrier or an adjacent region of the subterranean formation in which it is disposed. For instance, the at least one electrically conductive element may be positioned within the interlocking structure of each of the plurality of casing strings. Alternatively, where each of the plurality of casing strings includes a bore, the at least one electrically conductive element may be positioned within a bore of one or more of the plurality of casing strings.

In another aspect of the present invention, the containment system may include at least one protective element which is sized, positioned, and configured for protecting at least one electrically conductive element disposed at least partially therein. Alternatively or additionally, the protective element may be sized, configured, and positioned for sealing between portions of adjacent casing strings. Also, at least one protective element may be sized and positioned for maintaining a desired spacing between portions of adjacent casing strings. In an exemplary embodiment, the containment system may comprise two protective elements, and each of the two protective elements may include at least one electrically conductive element.

In a further aspect of the present invention, a containment system may comprise at least two electrically conductive elements which are disposed along a predicted leakage path. Such a configuration may be desirable for detecting leaks through the barrier.

The present invention also relates to a method of indicating at least one characteristic of at least a portion of a containment system for containing material within a selected region of a subterranean formation. Particularly, a plurality of casing strings may be provided, wherein each of the plurality of casing strings is adjoined to at least another adjacent casing string of the plurality of casing strings by way of an interlocking structure. Further, the plurality of casing strings may be positioned to collectively form a continuous barrier adjacent the selected region. In addition, at least one electrically conductive element may be disposed along at least a portion of the length of at least one of the plurality of casing strings forming the barrier and at least one characteristic associated with the barrier or a region of the subterranean formation adjacent thereto may be indicated responsive to performing electrical time domain reflectometry via the at least one electrically conductive element.

As mentioned above, the at least one electrically conductive element may be disposed within the interlocking structure of at least one of the plurality of casing strings. Also, the at least one electrically conductive element may be disposed at least partially within a protective element.

Indicating at least one characteristic of the barrier or adjacent region may include detecting a change in the impedance responsive to performing electrical time domain reflectometry via the at least one conductive element, indicating a location of the change in impedance responsive to performing electrical time domain reflectometry via the at least one electrically conductive element, or both.

In addition, electrical time domain reflectometry may be performed via the at least one electrically conductive element more than once, selectively, at random, on a periodic basis, substantially continuously (e.g., at least 10,000 times per second), or a combination thereof, without limitation.

In another aspect of the present invention, at least one interlocking structure between two adjacent casing strings of the plurality of casing strings of the barrier may be substantially filled with barrier filler material. The present invention contemplates that an electrical time domain reflectometry process may be performed during or after substantially filling the at least one interlocking structure with barrier filler material. Alternatively, an initial electrical time domain reflectometry process may be performed before the filling process and at least a subsequent electrical time domain reflectometry process may be performed spaced in time, during or after the filling process. Of course, results of the initial and the at least a subsequent electrical time domain reflectometry processes may be compared.

Indication of leakage through the barrier or a discontinuity or void in barrier filler material within the barrier may be identified in response to performing one or more electrical time domain reflectometry processes.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1A:
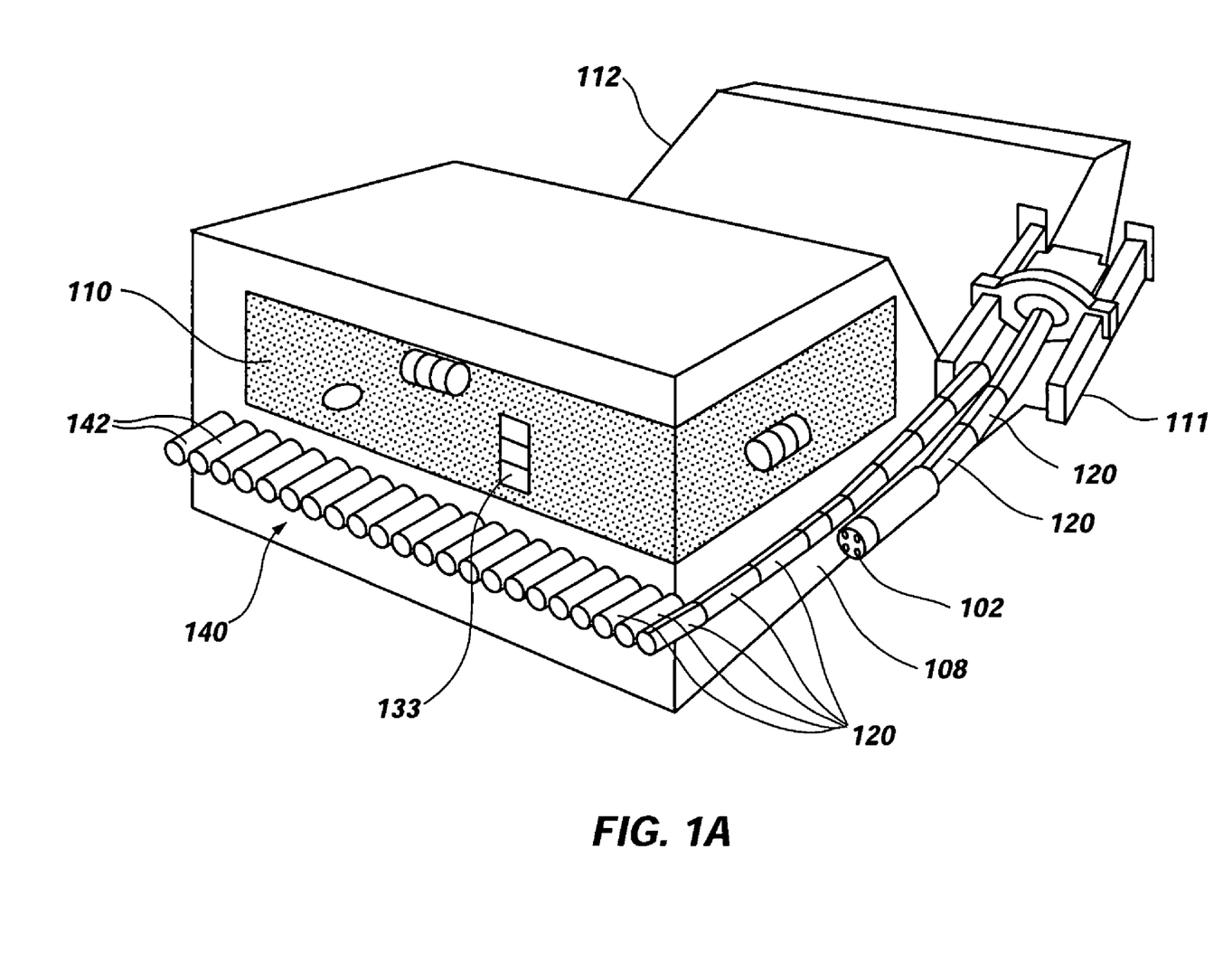
FIG. 1A shows a perspective cut-away view of a barrier of the present invention.

FIG. 1A shows a perspective cut-away view of a barrier 140 which may be formed by the methods of the present invention. As shown in FIG. 1A, a pipe jacking apparatus 111 and microtunneling machine 102 may be employed to form a plurality of adjacent casing-lined tunnels underneath a subsurface region 110. Particularly, casing strings 142 may comprise a plurality of casing sections 120 affixed to one another and extending longitudinally (lengthwise) in an end-to-end relationship and may be disposed within subterranean formation 108, as by tunneling or drilling methods and apparatus as known in the art. Further, the casing strings 142 disposed within the adjacent tunnels may be interlocked to form a subsurface barrier 140.

Preferably, each tunnel may be substantially circular in cross-section and may begin in trench or pit 112 extending to a corresponding trench (not shown) on the other side of subsurface region 110. Casing sections 120 may typically comprise steel. However, alternative materials that would provide desirable mechanical and material properties and durability are contemplated as being within the scope of this invention.

Further, as adjacent tunnels may be formed and lined with casing sections 120, a side wall of each casing section 120 of casing string 142 installed within a tunnel may be interlocked, during tunneling or drilling into formation 108, with a side wall of an adjacent casing section 120 of a casing string 142 disposed within an adjacent tunnel so that a continuous barrier 140 may be formed. Accordingly, each of casing sections 120 of one casing string 142 may be laterally adjoined to or interlocked with casing sections 120 of an adjacent casing string 142 by complementary interlocking structures (not shown). For instance, casing sections 120 may comprise interlocking structures as described in U.S. patent application Ser. No. 10/062,817 to Nickelson or U.S. patent application Ser. No. 10/358,633 to Nickelson, each of which applications is assigned to the assignee of the present invention and the disclosure of each of which is incorporated in its entirety by reference herein.

Figure 1B:
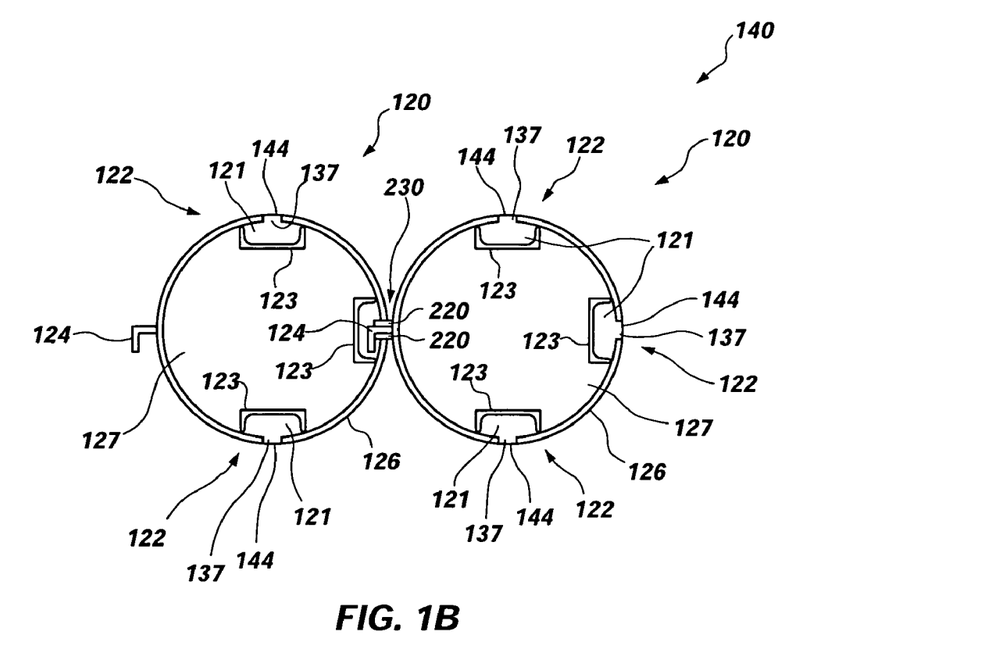
FIG. 1B shows a cross-sectional view of two interlocked, adjacent casing sections of a portion of the barrier shown in FIG. 1A.

More specifically, FIG. 1B shows a partial cross-sectional view of a portion of barrier 140 including two interlocked, adjacent casing sections 120, each casing section 120 including a substantially circular body 126 forming a bore 127. Alternatively, each of casing sections 120 may comprise other tubular cross-sectional shapes, as known in the art. In addition, each of casing sections 120 may include at least one male interlocking structure 124 and at least one female interlocking structure 122. Each female interlocking structure 122 may include a channel feature 123, which forms, in combination with portions of its associated substantially circular body 126, a recess 121. Optionally, a frangible closure element 144 may be disposed to close the mouth 137 formed between the circumferentially adjacent portions of substantially circular body 126 associated with a recess 121. Of course, disposing a male interlocking structure 124 within a female interlocking structure 122 may perforate the frangible closure element 144 associated therewith as the leading end of the male interlocking structure 124 proceeds longitudinally within the female interlocking structure 122 of an adjacent casing string 142 (FIG. 1A), according to the drilling or tunneling process for forming casing-lined tunnels mentioned above.

In the embodiment shown in FIG. 1B, interlocking structure 230 may include a male interlocking structure 124, which is configured as a generally L-shaped outwardly extending feature, relative to the substantially circular body 126 of casing section 120, which may be disposed within an associated female interlocking structure 122. It may be noted that the at least one female interlocking structure 122 including recess 121 may be disposed within the bore 127 of a casing section 120 and the frangible closure element 144 may be provided on the outer radial surface of its substantially circular body 126 as shown in FIG. 1B.

As known in the art, casing sections 120 of casing strings 142 (FIG. 1A) as well as interlocking structures 230 of adjacent casing sections 120, may be preferably substantially filled (within their bores 127, recesses 121, or both) with a barrier filler material (not shown) such as grout, wax, tar, cement, concrete, bentonite-based materials, modified cement, polysiloxane, acrylic polymers, or the like. For instance, barrier filler material may comprise wax which is flowed within casing strings 142 (FIG. 1A) and interlocking structures 230 thereof and subsequently solidifies to form a substantially leak-tight barrier 140 (FIG. 1A). More generally, barrier filler material comprising a liquid, slurry, granular material, or other flowable state (i.e., freely movable) may be disposed within the interlocking structures 230 and, optionally, may be subsequently solidified to form a substantially continuous leak-tight barrier 140. Also, as known in the art, barrier filler material disposed within bores 127, recesses 121, or both of casing sections 120 may produce a barrier 140 that is relatively chemically stable, even when exposed to solutions saturated with calcite, gypsum, or other reactive solutions.

Such a barrier configuration may be desirable, because a barrier 140 including interlocked casing strings 142 (FIG. 1A) as well as including barrier filler material (not shown) may exhibit a high degree of structural continuity and strength. Additionally, such a barrier 140 may demonstrate a relatively low hydraulic conductivity, which means that barrier 140 may be substantially impermeable to leachate or gas emitted from buried waste 133 (FIG. 1A). Barrier 140 may also be thermally stable and may retain its structural integrity and hydraulic conductivity under a wide variety of physical and thermal conditions including ground shifting, and relatively large temperature gradients. Also, barrier 140 may be configured for use in environments that experience cyclical freeze and thaw temperature conditions and in environments where precipitation may cause the presence of groundwater flow.

Therefore, it may be desirable to both verify the integrity of the barrier 140 upon or during its initial formation and to further verify the subsequent condition of the barrier 140 or, more particularly, the interlocking structures 230 thereof, after its initial formation. For instance, it may be desirable to measure or indicate that the barrier filler material has substantially uniformly filled voids within an interlocking structure 230 extending between adjacent, adjoined casing strings 142. It may also be desirable to determine or evaluate the presence of liquid within or proximate barrier filler material generally within an interlocking structure 230, because such presence may indicate at least the possibility of a leak or path through the barrier 140. While the materials and structural members comprising a casing string 142 may be generally selected to exhibit an initial suitable durability, monitoring performance over time of a barrier 140 may be of particular interest. Further, monitoring the integrity (impermeability) of an interlocking structure 230 may be of particular interest because if adjacent interlocked casing sections 120 move relative to one another, the barrier filler material (not shown) within interlocking structure 230 may suffer damage prior to either the male interlocking structure 124 or the female interlocking structure 122 of the adjacent casing sections 120, respectively. More generally, monitoring the integrity (impermeability) of an interlocking structure 230 or barrier 140 may be desirable due to the long-term exposure thereof to chemicals, water, or forces.

Figure 1C:
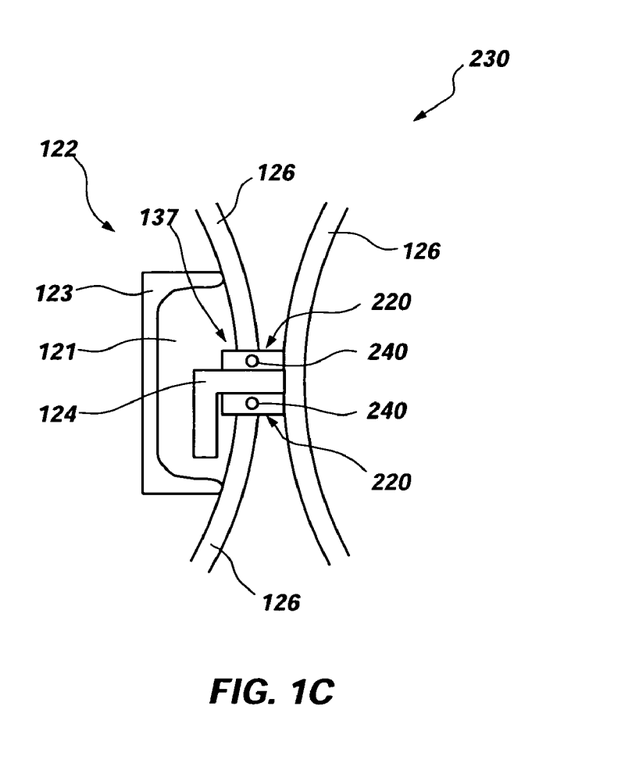
FIG. 1C shows an enlarged partial cross-sectional view of the interlocking structure shown in FIG. 1B.

FIG. 1C shows an enlarged partial cross-sectional view of an interlocking structure 230 as shown in FIG. 1B. Particularly, interlocking structure 230 may comprise protective elements 220 that may be disposed between a portion of the male interlocking structure 124 extending into recess 121 of a female interlocking structure 122 and the longitudinal edges of circular body 126 bounding the mouth 137 of recess 121. Protective elements 220 may be generally configured for protecting one or more electrically conductive element 240 disposed at least partially therein, respectively.

Additionally or alternatively, protective elements 220 may be configured for effecting a seal between casing sections 120. For instance, protective elements 220 may be resilient and may be disposed between male interlocking structure 124 and the edges of substantially circular body 126 of bounding the mouth 137 of recess 121 of a laterally adjacent casing section 120 into which male interlocking structure 124 extends. Such an arrangement, wherein protective elements 220 are compressed between a portion of male interlocking structure 124 and the edges of circular body 126 bounding the mouth 137 of recess 121, may substantially close the recess 121 to form a chamber. Forming a chamber comprising recess 121 may be desirable for both containing barrier filler material (not shown) therein and for preventing a leak therethrough. It may also be appreciated that protective elements may be sized and positioned for maintaining a desired spacing between portions of adjacent casing sections 120.

Protective elements 220 may each incorporate one or more electrically conductive elements 240 that may extend therein along the length of a casing string 142. Electrically conductive elements 240 may each comprise an electrically conductive wire which is completely encapsulated within a respective protective element 220. Alternatively, an electrically conductive element 240 may be exposed at a surface of its associated protective element 220, without limitation. Accordingly, an electrically conductive element 240 may be at least partially encapsulated within a protective element 220, according to the present invention. Each of electrically conductive elements 240 may comprise a coaxial cable or another electrical conductor which is electrically capable of carrying an electrical signal suitable for performing electrical time domain reflectometry.

Such a configuration may be desirable for indicating a characteristic of the barrier 140 proximate to the protective element 220 or within any region encompassed by the electrical influence of an electrically conductive element 240, by way of electrical time domain reflectometry (TDR). TDR may include introducing a voltage signal or waveform (usually configured with a relatively fast rise time, such as a step function) into the electrically conductive element and then observing the waveform as it is reflected by the transmission system (i.e., the electrically conductive element and its surrounding electrical environment). When the input signal encounters variations in impedance, the resultant reflections appearing at the point of introduction may be compared in phase, time, and amplitude with the original signal. Analysis of the reflected signal may indicate the nature (i.e., resistive, inductive, or capacitive) of the impedance variation in the transmission system and, since distance is related to time and the amplitude of the reflected step is directly related to impedance, the analysis may also indicate the location thereof, being the position of the impedance change along the electrically conductive element.

Put another way, as electromagnetic surface waves (which may be known as transverse electromagnetic waves) propagate along an electrically conductive element 240, signal energy may be attenuated responsive to the electrical impedance of the environment within its influence along its travel path. Accordingly, this reduction in signal voltage may serve as a basis for indicating changes in impedance in an area or region surrounding the electrically conductive element 240. For instance, electrical conductivity and volumetric water content may affect the impedance of an area or region surrounding the electrically conductive element 240 and, therefore, may cause a variation in the attenuation of such a signal or waveform.

Explaining further, TDR may be conceptually compared to a "lumped circuit load" transmission analogy. The transmission path may be assumed to comprise a lumped circuit having a load impedance at the end of the transmission line (e.g., a coaxial cable) of known characteristic impedance as well as the impedance of the surrounding environment encountered by the electromagnetic surface waves traveling therealong. Thus, as the impedance of the surrounding environment changes, TDR may indicate the nature of such changes and their relative position. Electrical impedance is related to the electrical or magnetic properties of material proximate to the transmission line, as well as the transmission line itself. For example, the material dielectric permittivity, magnetic permittivity, and the geometry of the proximate material, etc. may influence the electrical impedance along a transmission line; thus, these characteristics may be measured or indicated using TDR techniques.

Figure 1D:
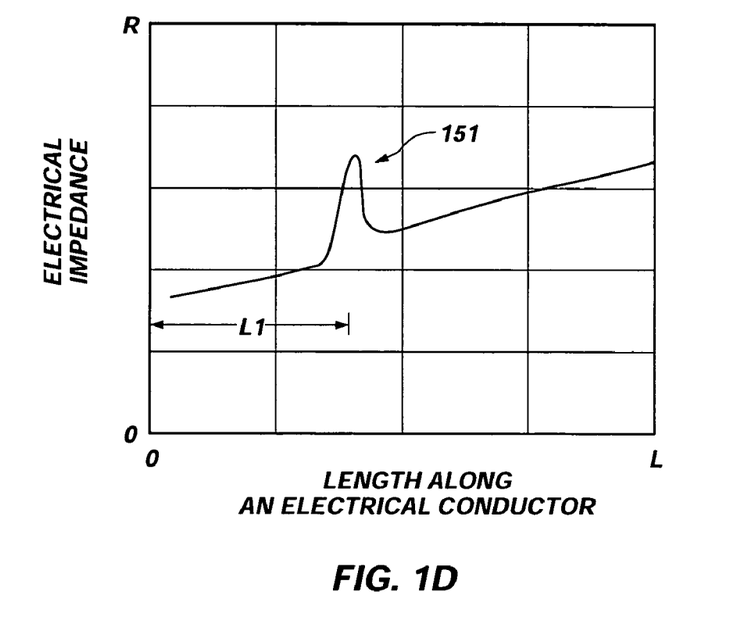
FIG. 1D shows a graphical representation of a TDR technique.

For conceptual purposes only, a TDR technique is illustrated as it may appear while being performed. FIG. 1D shows a graphical representation of a TDR technique. Particularly, FIG. 1D shows a graph which depicts values of electrical impedance as a function of length of an electrical conductor. Electrical impedance is shown on the vertical axis and is depicted as increasing in an upward direction (i.e., from 0 to R), while length of the electrical conductor is shown on the horizontal axis and is depicted as increasing in a direction toward the right (i.e., from 0 to L). Thus, electrical impedance is generally depicted as increasing as a function of increasing length of the electrical conductor; however, in proximity to a length L1, a distinctive change 151 in electrical impedance may be displayed. Of course, the distinctive change 151 in electrical impedance may be an increase or decrease, without limitation, and may proceed as a function of length as is indicated by the TDR process. Thus, the characteristic of a distinctive change 151 in electrical impedance may be correlated with the length along the electrical conductor, and the source or cause of the distinctive change 151 in electrical impedance may be determined or predicted. Further, the source or cause of the distinctive change 151 in electrical impedance may indicate a characteristic of a barrier, in accordance with the present invention.

It may be appreciated that correlation between impedance changes measured via TDR techniques and the characteristics of the barrier may be empirically (experimentally) or theoretically derived. Of course, any TDR process or equipment as known in the art may be used, without limitation. For instance, equipment for performing TDR analysis is commercially available from Tektronix, Inc., of Beaverton, Oreg.

Figure 1E:
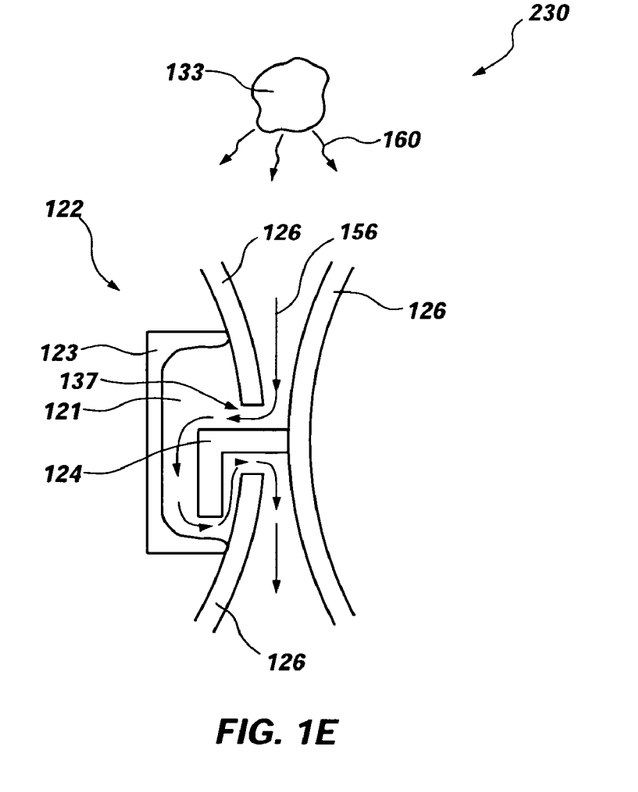
FIG. 1E shows a schematic enlarged partial cross-sectional view of the interlocking structure shown in relation to buried waste.

It may be appreciated that, assuming the structural elements of the interlocking structure 230 are impervious to liquid or gas, such gas or liquid may, if the barrier filler material (not shown) is not suitable to prevent it, possibly proceed to pass through the interlocking structure 230. For instance, FIG. 1E shows an enlarged partial cross-sectional view of an interlocking structure 230 in relation to buried waste 133. As further illustrated by path 156, liquid or gas that passes through interlocking structure 230, assuming that the substantially circular bodies 126, the female interlocking structure 122, the male interlocking structure 124, and any seams therebetween, respectively, are hydraulically and pneumatically impermeable, must pass through interlocking structure 230. Thus, as shown in FIG. 1E, liquid or gas may pass into the recess 121, about the portion of male interlocking structure 124 disposed therein, and out of the recess 121 along path 156. Accordingly, disposing protective elements 220 (shown in FIGS. 1C) within the gap formed between the portion of male interlocking structure 124 and the edges of substantially circular body 126 of the casing section 120 at the mouth 137 of recess 121 may inhibit the flow of fluid or gas through interlocking structure 230.

Figure 1F:
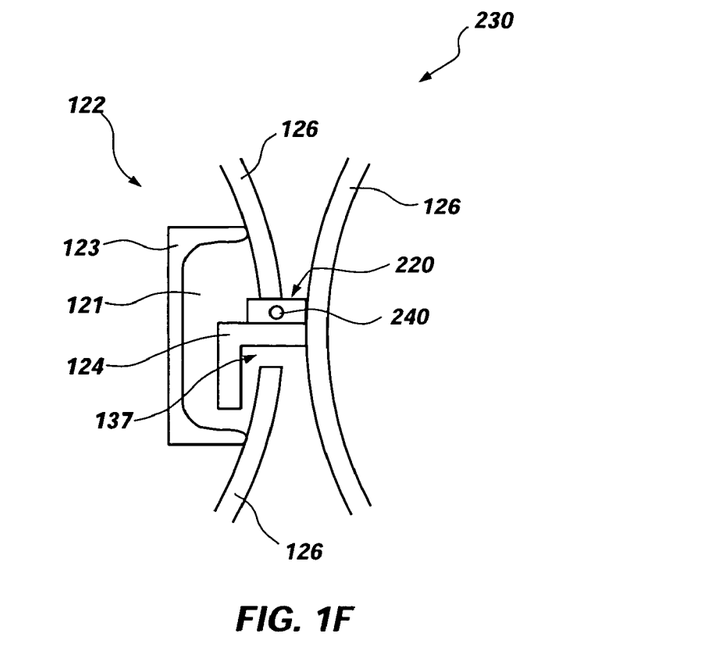
FIG. 1F shows an enlarged partial cross-sectional view of an interlocking structure of the present invention including a protective element.
Figure 1G:
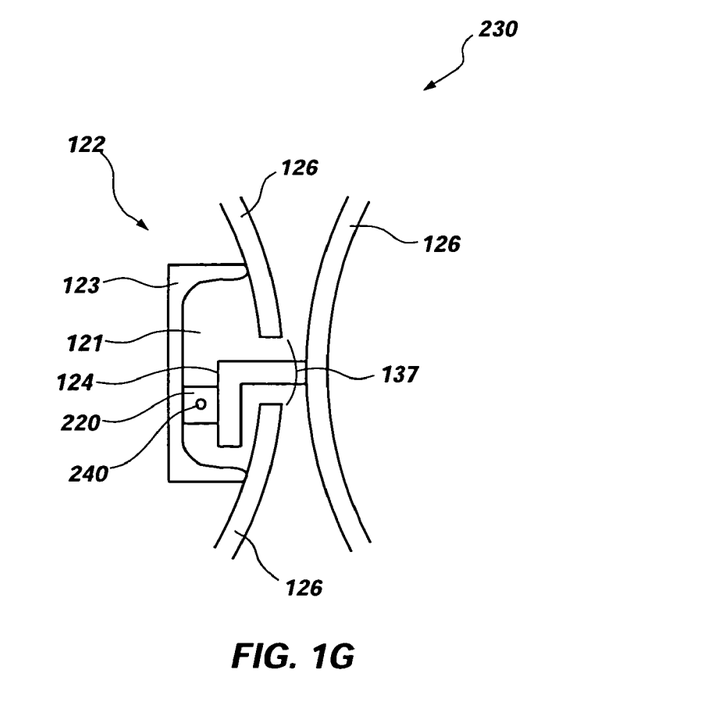
FIG. 1G shows an enlarged partial cross-sectional view of an alternative embodiment of an interlocking structure including a protective element of the present invention.

It should be understood that, generally, one or more protective element 220 may be positioned between two interlocked casing sections 120, without limitation. For instance, FIG. 1F shows an enlarged partial cross-sectional view of an interlocking structure 230, which includes one generally rectangular protective element 220 abutting and compressed against an edge of substantially circular body at the mouth 137 of recess 121. Protective element 220 also includes one electrically conductive element 240, as described hereinabove. Alternatively, FIG. 1G shows an enlarged partial cross-sectional view of an interlocking structure 230 which includes one generally square protective element 220, which further includes one electrically conductive element 240. Generally square protective element 220 abuts and is compressed against an inner wall of channel feature 123 of female interlocking structure 122. Disposing at least one protective element 220, the protective element 220 including at least one electrically conductive element 240 within the gap in an interlocking structure 230 between two casing sections 120, may, in turn, bias or position the male interlocking structure 124 in relation to the female interlocking structure 122.

More generally, it should also be understood that one or more protective elements 220, according to the present invention may be positioned within or upon a portion of barrier 140, without limitation. Thus, while it may be desirable to position a protective element 220 generally within or proximate to interlocking structures 230 of a barrier 140, the present invention is not so limited. For instance, at least one protective element 220 may be positioned between the substantially circular bodies 126 of adjacent casing sections 120 or upon at least one casing section 120, without limitation.

Figure 1H:
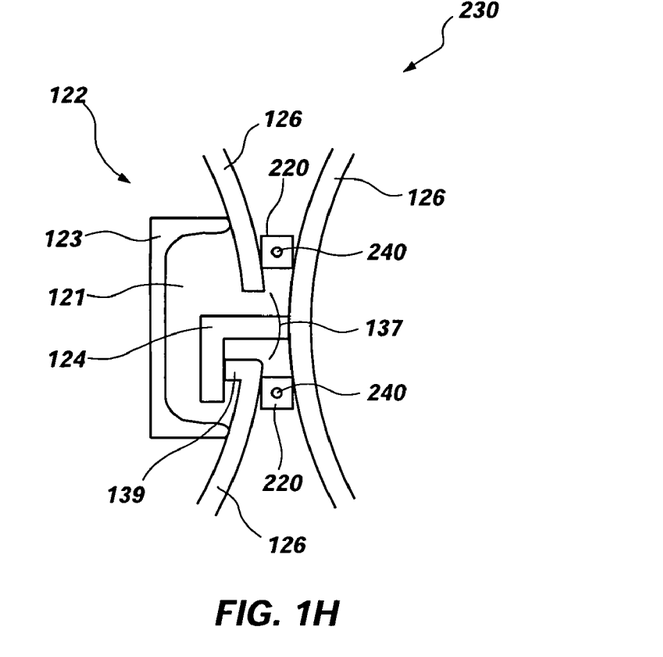
FIG. 1H shows an enlarged partial cross-sectional view of another alternative embodiment of an interlocking structure including a protective element of the present invention.

For instance, FIG. 1H shows an enlarged partial cross-sectional view of an interlocking structure 230 including generally square protective elements 220 which are disposed above and below mouth 137 of recess 121. In addition, each generally square protective element 220 may include, as shown in FIG. 1H, at least one conductive element 240. As shown in FIG. 1H, generally square protective elements 220 abut, and may be compressed between, the substantially circular bodies 126 of adjacent casing sections 120. Accordingly, the relative position of the substantially circular bodies 126 of adjacent casing sections 120 may be determined via cooperative engagement between the male interlocking structure 124 and the female interlocking structure 122. For instance, positioning stub 139 disposed within female interlocking structure 122 may position the substantially circular body 126 including the male interlocking structure 124 within a desired proximity in relation to the substantially circular body 126 including the female interlocking structure 122. Accordingly, disposing protective elements 220 between the substantially circular bodies 126 of adjacent casing sections 120 may inhibit the flow of fluid or gas through interlocking structure 230. Also, the at least one conductive element 240 disposed within each of protective elements 220 may be used for performing TDR. Accordingly, the at least one conductive element 240 disposed within each of protective elements 220 may be used for indicating at least one characteristic of the barrier, including interlocking structure 230.

Figure 2A:
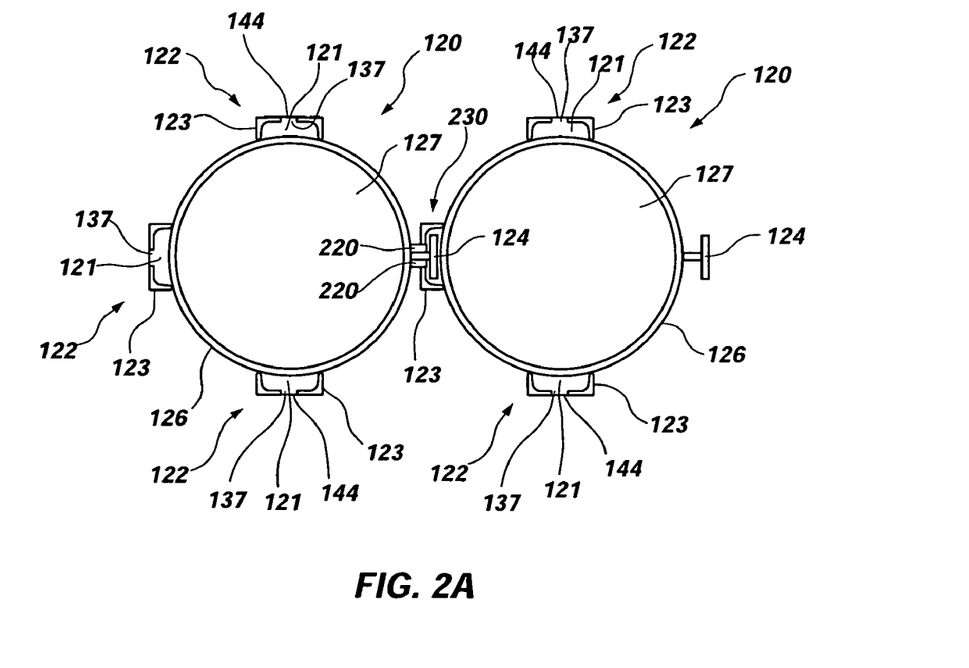
FIG. 2A shows a cross-sectional view of an alternative embodiment of two interlocked, adjacent casing sections of a barrier.

Of course, there may be many different configurations of the interlocking structure 230 between two casing sections 120. For instance, as shown in FIG. 2A, which shows a cross-sectional view of two interlocked casing sections 120, an at least one female interlocking structure 122 and an at least one male interlocking structure 124 may be disposed external to the respective bores 127 of casing sections 120. Also, male interlocking structure 124 may comprise a generally T-shaped outwardly extending feature, relative to the substantially circular body 126 of casing section 120. Similar to the configuration shown in FIG. 1B, interlocking structure 230 may be formed by a female interlocking structure 122 disposed about an associated male interlocking structure 124. Combinations of at least one female interlocking structure 122 and at least one male interlocking structure 124, which are either internal or external to the bore 127 of a casing section 120, are contemplated by the present invention, without limitation.

Figure 2B:
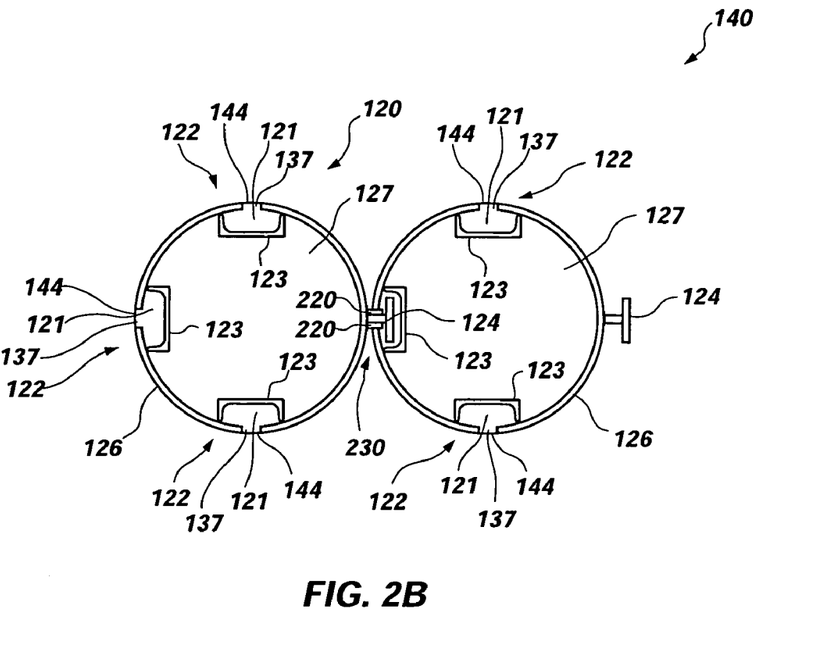
FIG. 2B shows a cross-sectional view of another embodiment of two interlocked, adjacent casing sections of a barrier.

In a further alternative, FIG. 2B shows a cross-sectional view of two interlocked casing sections 120 similar to those shown in FIG. 1B, but including a male interlocking structure 124 comprising a generally T-shaped outwardly extending feature, relative to the substantially circular body 126 of casing section 120. Such a configuration may be desirable for limiting the variability in the relative positions that two interlocked casing sections 120 may occupy while interlocked.

Considering FIGS. 1C, 2A, and 2B in relation to FIG. 1E, it may be appreciated that placement of at least two electrically conductive elements 240 along a predicted leakage path 156 of leachate through interlocking structure 230 may be desirable. For instance, placement of a first electrically conductive element (not shown) and at least a second electrically conductive element (not shown) along the predicted leakage path 156 at different locations therealong may facilitate indicating the progression of a leak through the interlocking structure 230 of the present invention via TDR. In addition, it should also be understood that more than two electrically conductive elements (not shown) may be disposed along a predicted leakage path 156 for indicating the presence or progression of a gas or liquid leak therethrough. Further, it may also be appreciated that placement of one or more protective elements (not shown) along path 156 may substantially impede a leak flowing therealong.

Figure 3A:
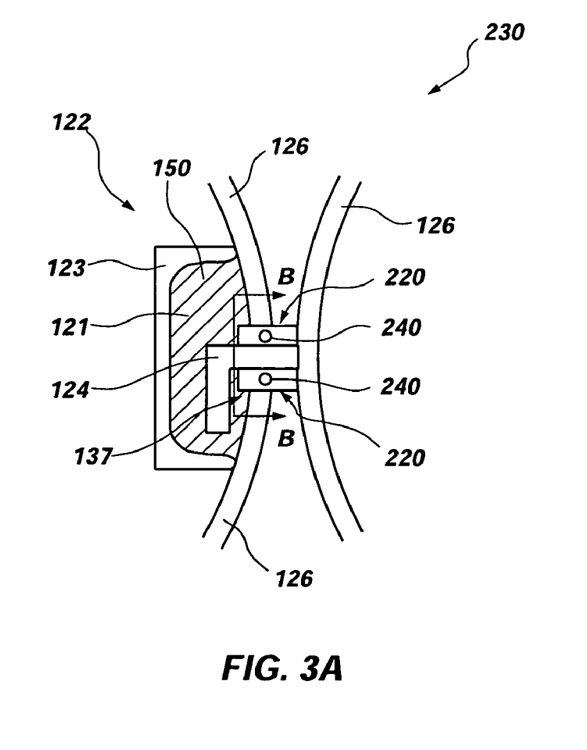
FIG. 3A shows an enlarged partial cross-sectional view of an interlocking structure of the present invention.

Turning to FIG. 3A, which shows an enlarged partial cross-sectional view of an interlocking structure 230 of the present invention, one or more electrically conductive elements 240 disposed generally within each of protective elements 220 may be employed to indicate the presence of barrier filler material 150 generally within interlocking structure 230. More particularly, one or more electrically conductive elements 240 generally within protective elements 220 may be used to indicate that barrier filler material 150 has been disposed proximate thereto. Such an indication may be desirable to verify the integrity of the interlocking structure 230.

Figure 3B:
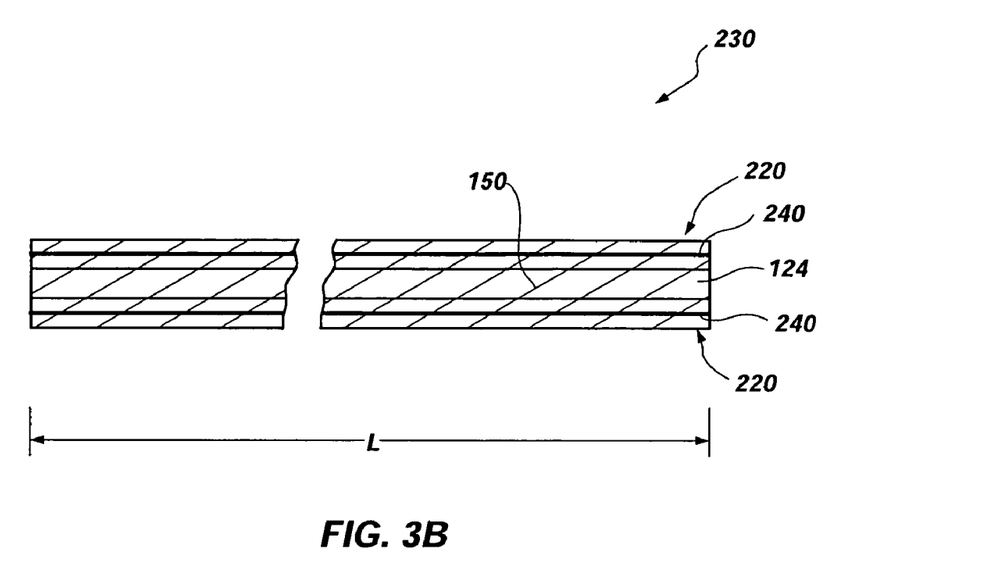
FIG. 3B shows a simplified schematic longitudinal cross-sectional view of the interlocking structure shown in FIG. 3A.

In further detail, FIG. 3B shows a simplified schematic longitudinal (i.e., along the length of a casing section) cross-sectional view, in the region of reference line B—B of FIG. 3A, showing protective elements 220, electrically conductive elements 240 disposed therein, and male interlocking structure 124 of interlocking structure 230. The cross-hatching shown in FIG. 3B indicates presence of barrier material 150, and is not associated with the different materials which may comprise male interlocking structure 124 or protective elements 220. Length, labeled "L" may include one or more casing section (FIG. 1A) or an entire casing string (FIG. 1A). Electrically conductive elements 240 disposed along length "L" may be desirable for indicating a characteristic of the environment proximate thereto, by way of TDR.

For instance, turning back to FIG. 3A, an initial TDR process may be performed prior to disposing barrier filler material 150 within the interlocking structure 230; thus, baseline or initial TDR data may be received or stored. Then, barrier filler material 150 may be disposed within interlocking structure 230 and afterwards, a subsequent TDR process may be performed. If, for instance, the barrier filler material 150 is disposed so as to substantially uniformly fill the recess 121, as shown in FIG. 3A, comparison between the initial and the subsequent TDR process may indicate such.

Figure 3C:
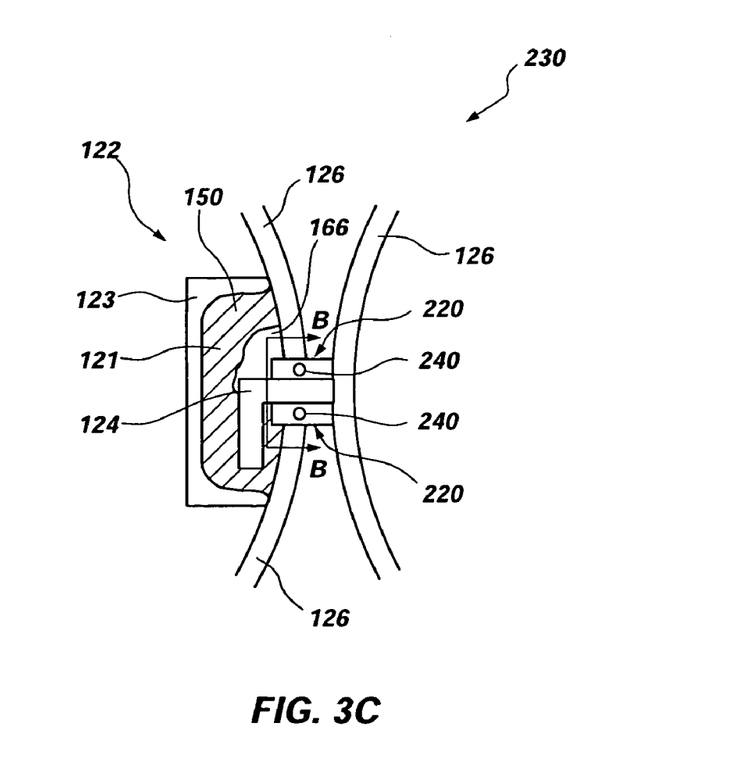
FIG. 3C shows an enlarged partial cross-sectional view of an interlocking structure of the present invention.
Figure 3D:
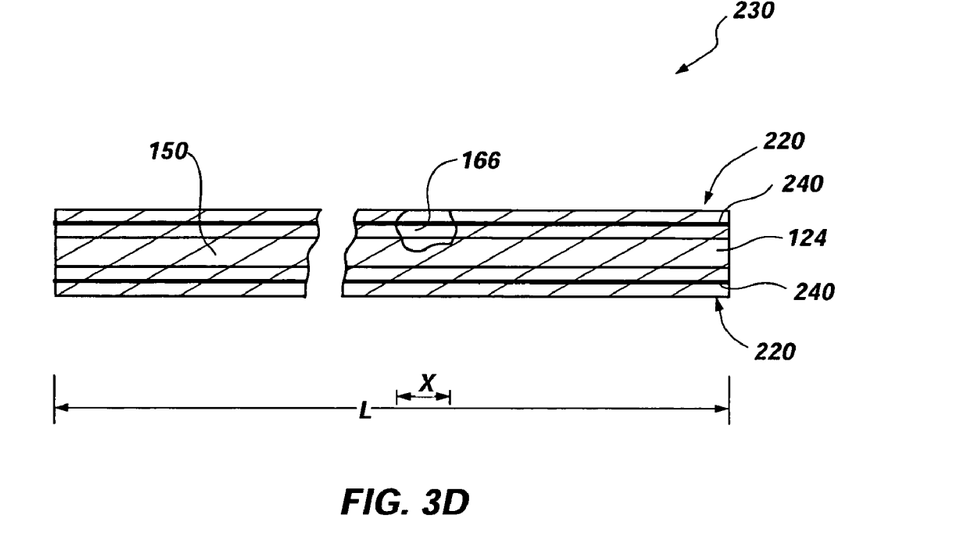
FIG. 3D shows a simplified schematic longitudinal cross-sectional view of the interlocking structure shown in FIG. 3B.

On the other hand, if, for example, barrier filler material 150 is disposed as shown in FIGS. 3C and 3D, which show a partial cross-sectional view of interlocking region 230 and a simplified schematic longitudinal (i.e., along the length of a casing section) cross-sectional view of interlocking structure 230, respectively, the initial TDR data and the subsequent TDR data may be compared and discontinuity 166 in the barrier filler material 150 disposed within the interlocking structure 230 may be indicated. It should be noted, for clarity, that FIG. 3D shows protective elements 220, electrically conductive elements 240 disposed therein, and male interlocking structure 124 of interlocking structure 230. However, the cross-hatching shown in FIG. 3D indicates presence of barrier material 150, and is not associated with the different materials which may comprise male interlocking structure 124 or protective elements 220.

Put another way, comparing initial TDR data to subsequent TDR data may indicate regions where the barrier filler material 150 may be different from other regions of barrier filler material 150. Particularly, comparing initial TDR data to subsequent TDR data may indicate the absence of barrier filler material 150 within regions along the length of an interlocking structure 230, proximate to electrically conductive elements 240.

In addition, as discussed above, TDR techniques may indicate the general position, labeled "x" in FIG. 3D, that discontinuity 166 occupies along the length "L" of the electrically conductive element 240. Accordingly, a position along the length of electrically conductive element 240 may be correlated to a position along the length of a casing section 120, a casing string 142, or both. Thus, the relative position of discontinuity 166 may be indicated via TDR.

Alternatively, TDR may be performed during the disposal of barrier filler material 150 within interlocking structure 230. Therefore, the progress of a flow front of barrier filler material 150 as it advances along the length of a casing string 142 may be monitored. For instance, if barrier filler material 150 comprises a hardenable or thickening fluid or slurry, TDR may be performed while the barrier filler material exhibits a flowable state (i.e., freely movable). Thus, such a process may indicate one or more discontinuities 166 (e.g., voids, such as air pockets, or other regions of differing composition), along the length of the one or more electrically conductive elements 240 that barrier filler material 150 does not "fill" or occupy, as discussed above. Further, upon such indication, remedial measures may be taken to ameliorate a discontinuity 166. For instance, in the case of an unfilled "bubble" of gas comprising discontinuity 166 that may exist in barrier filler material 150 entering or passing through the interlocking structure 230, characteristics of the barrier filler material 150 may be adjusted, if possible, to facilitate eradication of the discontinuity 166. For instance, flow characteristics (i.e., flow rate, duration of flow, flow pulsing, etc.) or material properties (i.e., viscosity, temperature, etc.) of the barrier filler material 150 may be altered during disposition thereof within interlocking structure 230. Of course, the same or similar procedures may be performed during filling of the bore 127 of a casing string 120 or during filling of any other region utilizing barrier filler material 150.

Also, subsequent to at least partially or substantially filling the interlocking structure 230 with barrier filler material 150, periodic TDR processes may be performed to monitor a characteristic of the regions proximate to the one or more electrically conductive element 240. For instance, the presence of water or other fluid may be indicated by TDR processes. Furthermore, as discussed above in relation to FIG. 1D, the general path of a liquid or gas from a waste sought to be contained by a barrier (FIG. 1A) through an interlocking structure 230 between adjacent casing strings (FIG. 1A) forming same may be predicted, to some extent, by the geometry of the interlocking structure 230 or as otherwise known in the art. Of course, electrical time domain reflectometry may be performed via the at least one electrically conductive element more than once, selectively, at random, on a periodic basis or a combination thereof prior to, during, or after substantially filling the interlocking structure 230 with barrier filler material 150.

Figure 4:
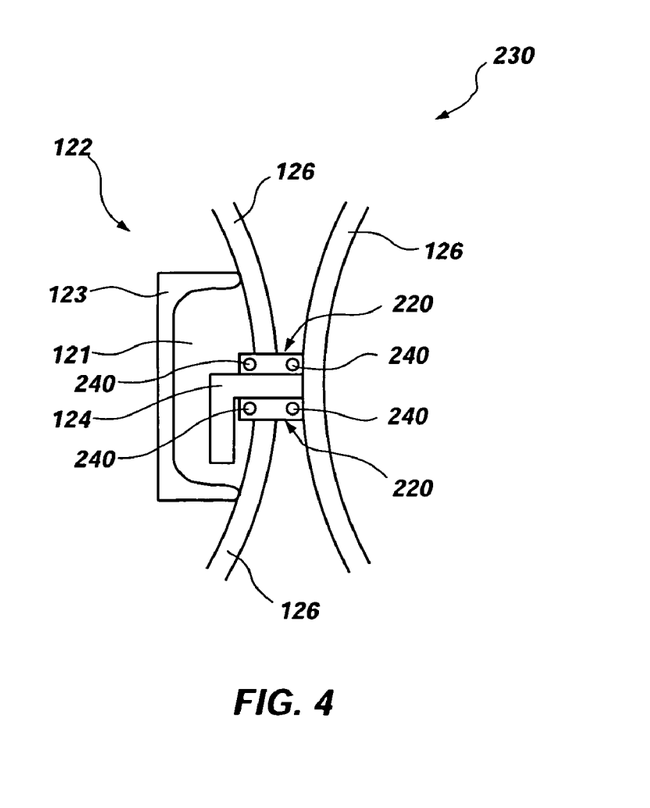
FIG. 4 shows an enlarged partial cross-sectional view of an interlocking structure as shown in FIG. 1B.

In another aspect of the present invention, a protective element 220 may include more than one electrically conductive element 240. FIG. 4 shows an enlarged partial cross-sectional view of an interlocking structure 230 as shown in FIG. 1B. More particularly, FIG. 4 shows two protective elements 220, wherein each protective element 220 includes two electrically conductive elements 240. As shown in FIG. 4, protective elements 220 may be disposed between the male interlocking structure 124 and the edges of substantially circular body 126 at the mouth 137 of recess 121. Providing more than one electrically conductive element 240 at least partially within a protective element 220 may provide more than one location for performing TDR, redundancy in measurement capability, or both, as well as the capability of developing a profile of a leak through barrier 140.

In another aspect of the present invention, the electrical signal or waveform that is communicated through an electrically conductive element of the present invention may be configured or adjusted for measurement or indication of particular characteristics. For instance, the relative signal magnitude (voltage or amperage) may be adjusted over suitable ranges in relation to the properties of an electrically conductive element over which it is to be communicated. Also, the time varying nature, if any, of the signal may be configured for indication or measurement of particular properties, without limitation. Therefore, it will be appreciated that one or more electrically conductive elements 240 according to the present invention may be disposed within a barrier (FIG. 1A) and may be positioned, sized, and configured to indicate different characteristics thereof. Alternatively, the same electrically conductive element 240 may be used to indicate different characteristics of the barrier (FIG. 1A) with which it is associated by communicating different waveforms therethrough for performing TDR.

Although embodiments of the present invention described hereinabove include at least one electrically conductive element 240 which is at least partially within a protective element 220, the present invention is not so limited. Rather, an electrically conductive element 240 may be separate from a protective element 220 of the present invention. For instance, an electrically conductive element 240 suitable for performing TDR may comprise a conductive wire, a coaxial cable, a shielded conductive wire, an insulated conductive wire, or combinations thereof as known in the art. Further, more generally, an electrically conductive element 240 of the present invention may be disposed generally upon or within a barrier 140. For instance, an electrically conductive element 240 may be disposed within the bore 127 of one or more casing strings 142, as described hereinbelow.

Figure 5A:
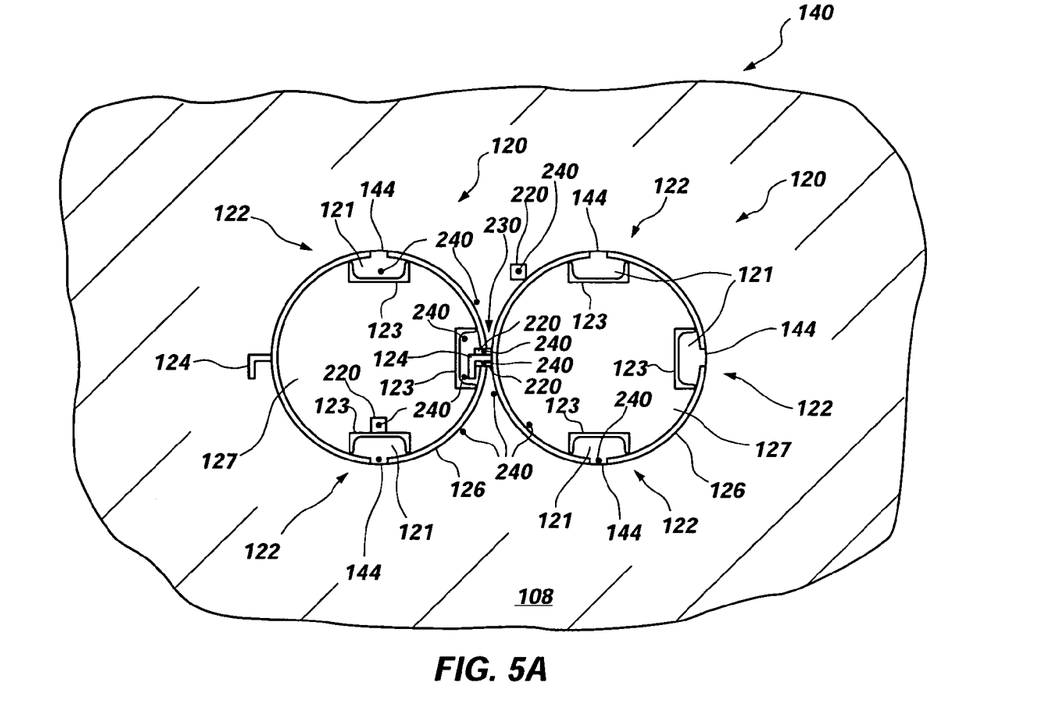
FIG. 5A shows a partial cross-sectional view of two adjacent casing strings which form a portion of a barrier according to the present invention disposed within a formation.

For example, FIG. 5A shows a partial cross-sectional view of two adjacent casing strings which form a portion of barrier 140 according to the present invention disposed within formation 108. Interlocking structure 230, as shown in FIG. 5A, is substantially identical to the interlocking structure 230 shown in FIG. 1C. More specifically, interlocking structure 230 may comprise protective elements 220 that may be disposed along both sides of the male interlocking structure 124 and the mouth 137 of recess 121. Further, according to the present invention, protective elements 220 may each include one or more electrically conductive elements 240 that may extend therein along the length of a casing string. As mentioned above, each of electrically conductive elements 240 may comprise a coaxial cable or another electrical conductor which is electrically capable of carrying an electrical signal suitable for performing electrical time domain reflectometry.

In addition, a plurality of electrically conductive elements 240 may be disposed proximate to the casing sections 120 of the casing strings (not shown) of the barrier 140. For instance, FIG. 5A shows at least one of the plurality of electrically conductive elements 240 may be positioned within a bore 127 of a casing section 120, within a recesses 121 of a casing section 120, or proximate the exterior of the substantially circular body 126 of a casing section 120, without limitation. Such a configuration may be suitable for monitoring of barrier filler material 150 disposed within at least one of a bore 127 of a casing section 120, a recess 121 thereof, and an interlocking structure 230 thereof, without limitation. Alternatively, such a configuration may provide for monitoring of leakage through barrier 140. Monitoring of the integrity of barrier filler material 150 or leakage through barrier 140 may be performed via TDR, as explained hereinabove.

Of course, referring to FIGS. 1A–5A, one or more electrically conductive elements 240 may be disposed within or upon a casing section 120 prior to its disposal within the formation 108. However, it may be desirable to protect against damage to an electrically conductive element 240 if disposing an electrically conductive element 240 within or upon a casing section 120 prior to disposal within the formation 108. Thus, the present invention contemplates that an electrically conductive element 240 may be protected by a portion of the casing section 120, such as, for instance, a protective stand-off, or an indentation or channel formed in the casing section 120.

Figure 5B:
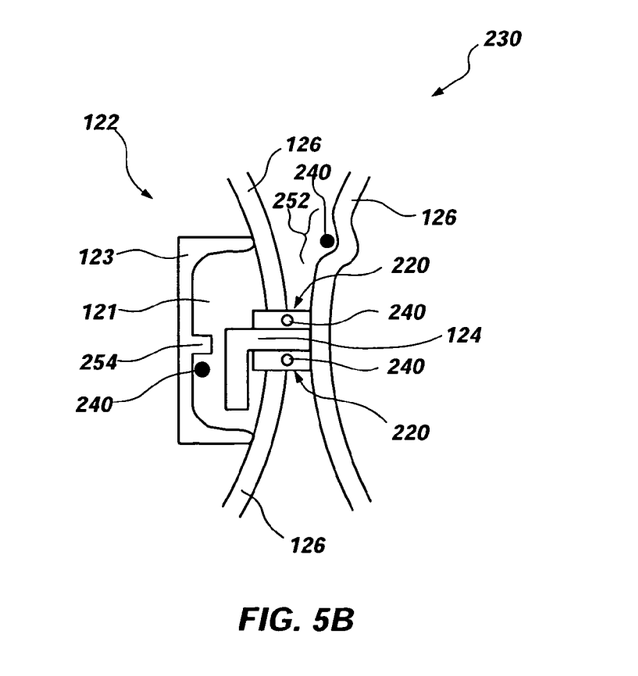
FIG. 5B shows an enlarged partial cross-sectional view of an interlocking structure of the present invention.

In further detail, FIG. 5B shows that an electrically conductive element 240 may be placed generally within an indentation or channel 252 formed in the substantially circular body 126 of a casing section (not shown). Of course, indentation or channel 252 may be arcuate, rectangular, or tapered (i.e., dove-tail) in shape, without limitation. Further, an electrically conductive element 240 may be placed within recess 121 proximate at least one stand-off 254, wherein the at least one stand-off 254 is sized and positioned to protect the electrically conductive element 240 proximate thereto from damage due to relative movement between the male interlocking structure 124 and the female interlocking structure 122. Such a configuration may be desirable for protection of the electrically conductive elements 240. Alternatively, an indentation 252 or at least one stand-off 254 may be sized and positioned to provide a space or envelope along the length of a casing string 142 for disposition of an electrically conductive element 240 therein subsequent to formation of a barrier (not shown).

While the present invention has been described herein with respect to certain preferred embodiments, those of ordinary skill in the art will recognize and appreciate that it is not so limited. Rather, many additions, deletions and modifications to the preferred embodiments may be made without departing from the scope of the invention as hereinafter claimed. In addition, features from one embodiment may be combined with features of another embodiment while still being encompassed within the scope of the invention as contemplated by the inventors. Therefore, the invention is to encompass all modifications, equivalents, and alternatives falling within the spirit and scope of the invention as defined by the following appended claims.

What is claimed is:

1. A containment system for providing a barrier adjacent a selected region of a subterranean formation, the containment system comprising:
   a plurality of casing strings, wherein each of the plurality of casing strings is laterally adjoined to at least one other adjacent casing string of the plurality of casing strings by way of an interlocking structure extending therebetween; and
   at least one electrically conductive element disposed along at least a portion of a length of at least one of the plurality of casing strings, at least a portion of the at least one electrically conductive element being positioned proximate an interlocking structure between at least two casing strings of the plurality, the at least one electrically conductive element configured to communicate an electrical signal therethrough to indicate the presence of foreign matter passing through the interlocking structure between the at least two casing strings of the plurality.

2. The containment system of claim 1, further comprising a device electrically coupled to the at least one electrically conductive element, the device configured to introduce an electrical signal into the at least one electrically conductive element and to receive reflected electrical signals from the at least one electrically conductive element.

3. The containment system of claim 1, further comprising barrier filler material disposed within the interlocking structures extending between casing strings of the plurality.

4. The containment system of claim 1, wherein:
   each casing string of the plurality includes a bore; and
   the at least one electrically conductive element is positioned within the bore of at least one of the plurality of casing strings.

5. The containment system of claim 4, further comprising barrier filler material disposed within the bore of each casing string of the plurality.

6. The containment system of claim 1, wherein the at least one electrically conductive element comprises a coaxial cable.

7. The containment system of claim 1, further comprising at least one elongated protective element sized, positioned, and configured for effecting a seal between at least two casing strings of the plurality.

8. The containment system of claim 7, wherein the at least one protective element comprises at least one of polyethylene and nylon.

9. The containment system of claim 7, wherein the at least one electrically conductive element is disposed at least partially within the at least one protective element.

10. The containment system of claim 9, wherein the at least one electrically conductive element comprises at least two laterally spaced electrically conductive elements.

11. The containment system of claim 7, wherein the at least one protective element comprises at least two elongated protective elements, and each of the at least two protective elements carries the at least one electrically conductive element.

12. The containment system of claim 11, wherein each of the at least two protective elements carries two electrically conductive elements.

13. The containment system of claim 1, wherein:
   the at least one electrically conductive element comprises at least two electrically conductive elements; and
   the at least two electrically conductive elements are each disposed along a predicted leakage path through the barrier.

14. The containment system of claim 1, wherein the at least one electrically conductive element is positioned within the interlocking structure between at least two casing strings of the plurality.

15. The containment system of claim 1, further comprising at least one stand-off adjacent and protruding beyond the at least one electrically conductive element and sized, positioned, and configured to inhibit damage thereto from relative movement of the at least two casing strings.

16. The containment system of claim 1, further comprising at least one indentation extending longitudinally along a structure of at least one casing string of the plurality and wherein the at least one electrically conductive element is at least partially disposed within the at least one indentation.

17. The containment system of claim 1, wherein the at least one electrically conductive element is positioned upon an exterior of one of the casing strings of the plurality.

18. The containment system of claim 1, wherein:
   each of the plurality of casing strings includes at least one male interlocking structure and at least one female interlocking structure cooperatively configured to engage at least a portion of the at least one male interlocking structure; and
   wherein the at least one electrically conductive element is disposed at least partially within the at least one female interlocking structure.

19. The containment system of claim 18, wherein:
   the at least one female interlocking structure of each of the plurality of casing strings is cooperatively engaged with the at least one male interlocking structure of a laterally adjacent casing string of the plurality; and wherein the at least one electrically conductive element is disposed within the at least one cooperatively engaged female interlocking structure.

20. The containment system of claim 18, wherein:

the at least one female interlocking structure of each of the plurality of casing strings is cooperatively engaged with the at least one male interlocking structure of a laterally adjacent casing string of the plurality; and wherein the at least one electrically conductive element is carried by an elongated protective element disposed in a gap between a portion of the at least one female interlocking structure and a portion of the at least one cooperatively engaged male interlocking structure.

21. The containment system of claim 20, wherein the at least one electrically conductive element is at least partially disposed within the elongated protective element.

22. The containment system of claim 21, wherein the at least one electrically conductive element is enclosed within the elongated protective element.

23. The containment system of claim 22, wherein the at least one electrically conductive element comprises two laterally spaced electrically conductive elements.

* * * * *